3,079,367
EPOXY RESIN COPOLYMERS
Paul Fram, Lincoln Township, and Robert R. Charbonneau, Woodbury Township, Washington County, Minn., assignors to Minnesota Mining and Manufacturing Company, St. Paul, Minn., a corporation of Delaware
No Drawing. Filed Mar. 30, 1959, Ser. No. 802,631
8 Claims. (Cl. 260—47)

This invention relates to copolymeric compositions and more particularly to copolymers of epoxy resins with certain polyfunctional alkylenimine derivatives.

Monomers and low polymers containing functional epoxy groups, which are collectively termed "epoxy resins" hereinafter for convenience and brevity, are well known. These substances are readily prepared, for example, by the interaction of epichlorohydrin with a polyhydric phenol. They are commonly cured or copolymerized with such compounds as polyfunctional amines, organic acids, acid anhydrides, and the like. Certain of the epoxy resins cure to form solid polymers which have the excellent strength and heat resistance properties required in various high performance applications, e.g. in heated plastic dies, radomes and in certain ducting and structural uses. These particular resins, however, have been typically difficult to process and handle. If, on the other hand, epoxy resins having improved processing and handling characteristics have been used, strength and heat resistance have been sacrificed.

It is an object of the present invention to provide a new and useful class of copolymeric resins.

It is another object of the present invention to provide a class of liquid compositions which cure at relatively low temperatures (often at room temperature) without appreciable shrinkage to dense, tough, resinous solids.

It is another object of the present invention to provide a novel and useful class of plastic tooling resins.

It is still another object of the present invention to provide 100 percent solid-forming high temperature resistant resin systems for use in reinforced plastics and other applications requiring ultimate properties equal to or superior to epoxy resin systems and having greatly superior handling and processing characteristics.

Additional objects will be apparent to those skilled in the art from reading the specification which follows.

In accordance with the above and other objects of the invention it has been found that when epoxy resins are copolymerized with the hereinafter-defined polyfunctional alkylenimine derivatives, new resinous compositions are produced which have highly advantageous properties, as set forth hereinafter in detail.

Epoxy resins in general (i.e. those organic compounds containing reactive ethoxyline groups) are suitable for use in the present invention. Among the epoxy resins useful in the practice of the present invention are complex polymeric reaction products of polyhydric phenols with polyfunctional halohydrins such as epichlorohydrin and glycerol dichlorohydrin. Such resins are disclosed in United States Patent 2,585,115, and in the textbook "Epoxy Resins, Their Applications and Technology," by Lee et al., McGraw-Hill Book Company, Inc., New York, N.Y., 1957, particularly in chapter 1 thereof. A table is given at pages 19 and 20 of that book in which are tabulated the basic chemical types, and properties of a number of commercially available epoxy resins. Resins of the type characterized in this table are among the epoxy resins suitable for use in the present invention.

The polyfunctional alkylenimine derivatives employed in preparing the copolymers of the invention are substituted ethylene amides (for convenience, sometimes herein referred to as "bis-amides") of the type represented by the following formula:

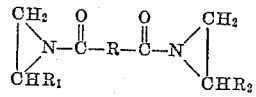

wherein R represents a member of the group consisting of divalent aliphatic hydrocarbon radicals having from 6 to 18 carbon atoms, the 1,3-phenylene radical and the 1,4-phenylene radical and $R_1$ and $R_2$ each represent hydrogen or a lower alkyl group, i.e. having from 1 to 4 carbon atoms.

The bis-amide-epoxy resin copolymers of the invention, after having been subjected to the curing process, demonstrate a high degree of toughness, resistance to shock and to high temperatures and resistance to water. These characteristics render them useful as potting, molding, casting and laminating resins. Molded objects from these infusible products have hard glossy surfaces but despite this hardness the molded structures are tough and resilient.

Lamination and impregnation of materials such as wood, glass, glass fabric, synthetic fibers such as nylon and Orlon paperboard, etc. are extremely important fields of application for the new compositions. This is particularly true in the impregnation of glass fibers to form reinforced plastic compositions suitable for use for example in automobile bodies, truck and railroad car construction, aircraft construction, industrial piping, etc. In addition, compositions of the invention are valuable in such other varied applications in the field of resin technology as industrial adhesives, protective and decorative coatings, etc.

Depending on the reactivity of the uncured mixtures which cure to form the compositions of the invention, polymerization takes place, generally with only moderate heating if any increase in temperature is required, over varying periods of time. The reactivity of any copolymer system of the invention depends upon such factors as the physical state (solid or liquid) of the constituents, their viscosities, the presence of additives such as solvents, fillers and other resins, as well as upon the catalyst system, if any, which is used. The catalyst system is particularly important in determining the intermediate properties of the copolymers (e.g. pot life, amount and controllability of exotherm, curing time and temperature, etc.) as well as their ultimate properties (e.g. hardness, tensile properties, toughness, impact resistance, high temperature resistance, color, etc.) and therefore their ultimate utility. The catalysts which are used in the copolymer systems of this invention are generally speaking the catalysts useful in epoxy resin polymerization systems, i.e. "epoxy-type" catalysts. Among the catalysts which can be used with the copolymers of the present invention are amines such as diethylene triamine, triethylene tetramine, tetraethylene pentamine, 1,3-pentamethyl diethylene triamine, m-phenylene diamine, the liquid eutectic mixture of m-phenylene diamine and 4-isopropyl-m-phenylene diamine, 4,4'-diamino diphenylsulfone, methylene-bis-o-chloroaniline, menthane diamine, 4,4'-methylene dianiline and tridimethyl amino methyl phenol (available commercially under the trade designation "DMP-30"); catalysts such as coordination compounds of boron trifluoride with amines (e.g. boron trifluoride monomethylamine available commercially under the trade designation "BF3-400"), with sulfides, etc.; anhydrides such as dodecenyl succinic anhydride, chlorendic anhydride, pyromellitic dianhydride; hydrazides such as adipyl dihydrazide and isophthalyl dihydrazide, and the like.

Depending upon the particular application, the reaction can be conducted in the presence or absence of solvents or diluents. In many cases the epoxy resin and/ or the bis-amide will be liquid and the reaction can be effected easily without addition of solvents or diluents. However, in some cases, where either or both reactants are solids, it may be desirable to add diluents to assist in effecting the reaction.

The epoxy resins and the bis-amides are both capable of homopolymerization in the presence of suitable curing agents to solid, resinous compositions. In the case of the epoxy resins these curing agents are generally well known, e.g. polyfunctional amines, organic acids and acid anhydrides, etc. (as previously stated). The homopolymerization of bis-amides is catalyzed by weak or strong acids and bases. Among the acids are the heavy metal chlorides, such as zinc or lead chlorides, the mineral acids, such as hydrochloric, sulfuric or phosphoric acids, sulfonic acids such as p-toluenesulfonic acid, and other acids. Another catalyst which is effective is the boron trifluoride molecular addition product with monoethylamine. Among the bases are sodium methoxide, while amines such as ethylene diamine or monoethanolamine and hydrazides such as isophthalyl dihydrazide act as curing agents and polyfunctional amines can be copolymerized with the bis-amides. In the presence of a suitable curing agent, substantially all proportions of the epoxy resins and the bis-amides may be copolymerized. In mixtures containing a great preponderance of one or the other constituent, therefore, it is possible to achieve simultaneously polymerization among units of the major constituent itself and between units of the major and minor constituents. The final cured polymer molecules will thus include units of both constituents in the relative amounts in which they were originally added. It should be noted that in order to realize the novel properties of the copolymers of the present invention it is necessary that at least a significant amount of the minor constituent be present. An amount of about 5 percent or more yields a significant change in properties.

I. THE BIS-AMIDES

Among the bis-amides useful as comonomers in the present invention are

N,N'-bis-1,2-ethylenisosebacamide;
N,N'-bis-1,2-ethylensebacamide;
N,N'-bis-1,2-ethylensuberamide;
N,N'-bis-1,2-ethylenazelaamide;
N,N'-bis-1,2-ethylendodecane dicarboxylic acid amide;
N,N'-bis-1,2-ethylentetradecane dicarboxylic acid amide;
N,N'-bis-1,2-ethylenhexadecane dicarboxylic acid amide;
N,N'-bis-1,2-ethylenoctadecanedicarboxylic acid amide;
N,N'-bis-1,2-butylenisosebacamide;
N,N'-bis-1,2-propylensuberamide;
N,N'-bis-1,2-butylensuberamide;
N,N'-bis-1,2-propylenazelaamide;
N,N'-bis-1,2-butylenazelaamide;
N,N'-bis-1,2-propylentetradecanedicarboxylic acid amide;
N,N'-bis-1,2-propylenoctadecanedicarboxylic acid amide;
N,N'-bis-1,2-propylendodecanedicarboxylic acid amide;
N,N'-bis-1,2-pentylensebacamide;
N,N'-bis-1,2-ethylenisophthalamide;
N,N'bis-1,2-ethylenterephthalamide;
N,N'-bis-1,2-butylenisophthalamide;
N,N-bis-1,2-propylenisophthalamide;
N,N'-bis-1,2-pentylenisophthalamide;
N,N'-bis-1,2-propylenterephthalamide.

Mixtures of the bis-amide monomers may be produced by employing mixed 1,2-alkylenimines.

The N,N'-bis-alkylenamides are prepared in monomeric form by the following process: a 1,2-alkylenimine, desirably containing not more than 6 carbon atoms, such as ethylenimine, 1,2-propylenimine, 1,2-butylenimine, 1,2-pentylenimine, etc., is reacted with an aliphatic hydrocarbon dicarboxylic acid chloride containing 8 to 20 carbon atoms (for example isosebacoyl dichloride, sebacoyl dichloride, suberoyl dichloride, azelaoyl dichloride, tetradecanoyl dichloride, dodecanoyl dichloride, hexadecanoyl dichloride, octadecanoyl dichloride), isophthaloyl dichloride or terephthaloyl dichloride, to produce the desired substantially pure N,N'-bis-1,2-alkylenamide monomer, with hydrogen chloride as a by-product. The 1,2-alkylenimine is employed in a ratio of about 2 moles for each mole of dibasic acid chloride. Advantageously, an excess of 1,2-alkylenimine, such as about 5 percent by weight, over and above this ratio may be employed, although an excess of up to about 25 percent may be employed.

Desirably, the 1,2-alkylenimine is introduced in an aqueous solution which also contains an alkali-metal carbonate, such as sodium, potassium or lithium carbonate, which acts as an acid acceptor to neutralize the hydrogen chloride formed during the reaction of the process. When a higher 1,2-alkylenimine than ethylenimine, i.e., one containing more than 2 carbon atoms, is employed, an alkali-metal bicarbonate, such as sodium, potassium or lithium bicarbonate, may be used as the acid acceptor instead of a carbonate. This aqueous solution is intimately mixed with dibasic acid chloride dissolved in a substantially water-immiscible organic solvent which is chemically inert to both the reactants and the reaction products and in which the resulting N,N'-bis-1,2-alkylenamide is soluble. The N,N'-bis-alkylenamide monomer reaction product is then recovered in a relatively pure, stable state in high yield from the organic solvent, in which it collects as the reaction proceeds, by evaporating the solvent. This process of producing the monomers has been found to be the only one which effectively minmizes attack on and decomposition of the N,N' - bis-alkylenamide by hydrogen chloride formed during the course of the reaction.

In order more clearly to disclose the preparation of the intermediate bis-amide compounds, specific examples of the preparation of some of them will now be described. All parts in these examples are by weight unless otherwise designated.

A. *Preparation of N,N'-bis-1,2-ethylenisosebacamide.*—
A solution of about 95.6 parts of isosebacoyl dichloride prepared from "isosebacic acid" (a product of the U.S. Industrial Chemical Company consisting of 72–80 percent of 2-ethylsuberic acid, 12–18 percent of 2,5-diethyladipic acid and 6–10 percent of n-sebacic acid) dissolved in 400 parts of diethyl ether is added dropwise with cooling and vigorous stirring to a flask containing a solution of 110 parts of potassium carbonate, 800 parts of water and 43 parts of ethylenimine. The temperature of the mixture is maintained below 15° C. and the acid chloride is added at a rate of approximately one part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide remains as a water-white liquid. The yield is 93 percent of theoretical. When subjected to analysis the product is found to contain 10.8 percent nitrogen and 33.3 percent azirane radical as compared wtih the calculated values of 11.1 percent and 33.3 percent, respectively.

B. *Preparation of N,N'-bis-1,2 butylenisosebacamide.*—
To a reaction flask equipped with a stirrer, thermometer, condenser and dropping funnel is charged a solution of about 55.2 parts of potassium carbonate and 15.8 parts of 1,2-butylenimine in 200 parts of water. The solution is stirred and cooled to about 4° C. To the cooled solution is than added dropwise, with stirring and cooling, over a period of about 23 minutes, a solution of about 23.9 parts of isosebacoyl dichloride dissolved in 72 parts of diethyl ether. During the addition, the temperature of the reaction mixture is maintained at about 4–8° C. After the addition is completed, the mixture is allowed to warm gradually to room temperature (21° C.) and stirring is continued for about 12 hours. During the course of the reaction the pH falls from pH 12.5 at the beginning to about pH 10.0 at the end. The ether layer is separated and dried by storing over anhydrous sodium hydroxide pellets for 1 hour at 0° C., the pellets are removed by filtration and the ether evaporated. The resulting N,N'-bis-1,2-butylenisosebacamide remains a water-white liquid. The yield is about 90 percent of theoretical. When subjected to analysis the N,N'-bis-1,2-butylenisosebacamide thus prepared was found to contain 0.6 percent chlorine and 43.1 percent 2-ethylazirane radical as compared with the calculated values of 0 percent and 45.5 percent, respectively.

It will be obvious that the curing agents employed herein are prepared by selecting the appropriate 1,2-alkylenimine and dicarboxylic acid chloride, which are condensed by the procedures set forth above. In this way, the following compounds, which are further illustrative of the curing agents of the invention, are prepared, having the noted properties:

| Compound | M.P. ° C. | Appearance |
| --- | --- | --- |
| N,N'-bis-1,2-ethylensebacamide | 59.5–61 | White, crystalline solid. |
| N,N'-bis-1,2-ethylenazelamide | 44–46.5 | Do. |
| N,N'-bis-1,2-ethylendodecane-dicarboxylic acid amide. | 74–76 | Tan-colored solid. |
| N,N'-bis-1,2-propylensebacamide. | 31.4–32.5 | White, crystalline solid. |
| N,N'-bis-1,2-propylenisosebacamide. |  | Water-white liquid. |
| N,N'-bis-1,2-ethylenisophthalamide. | 76–78 | White, crystalline solid. |
| N,N'-bis-1,2-butylenisophthalamide. |  | Water-white viscous liquid. |
| N,N'-bis-1,2-propyleniso-phthalamide. |  | Water-white liquid. |
| N,N'-bis-1,2-ethylentere-phthalamide. | 140 | White, crystalline solid. |
| N,N'-bis-1,2-propylentere-phthalamide. | 96–108 | Do. |
| N,N'-bis-1,2-butylentere-phthalamide. | 98–110 | Do. |

In the same way, there are prepared the other N,N'-bis-1,2-alkylenamides described hereinabove.

II. THE EPOXY RESINS

Epoxy resins in general are suitable for use in the present invention. These epoxy resins are complex polymeric reaction products of polyhydric phenols with polyfunctional halohydrins such as epichlorohydrin and glycerol dischorohydrin. Usually the difunctional chlorohydrin is used in proportion in excess of that equivalent to the polyhydric phenol and less than that which is twice the equivalent amount. The reaction is carried out in the presence of caustic alkali which is suitably employed in at least the quantity necessary to combine with the halogen liberated from the halohydrin, and usually is employed in excess. The products obtained may contain terminal epoxy groups or terminal epoxy groups together with terminal primary hydroxyl groups. In the complex reaction mixture the terminal epoxy groups are generally in excess of the terminal primary hydroxyl groups. Typical polyhydric phenols include resorcinol and the various bisphenols resulting from the condensation of phenol with aldehydes and ketones such as formaldehyde, acetaldehyde, acetone, methyl ethyl ketone, and the like. The essential feature of the epoxy resins used in the compositions of the invention is the presence therein of functional epoxy groups. The remainder of the molecule, which ordinarily does not enter into the reaction with the ethyleneimine ring, may to some extent influence the properties of the polymer finally obtained.

The molecular weight of the epoxy resins can be controlled by the relative proportions of the reactants, as well as by the extent to which the reaction is carried out. The molecular weight of the resin is not critical since both very low molecular weight resins and very high molecular weight resins can be copolymerized with the bis-amides. The properties of the cured resin compositions may of course vary with the molecular weight of the epoxy resin employed as well as the nature of the bis-amide employed. They can be made of varying melting points, epoxide contents, and degrees of polymerization from liquids and soft resins to harder resins of higher melting point. In general these resins, unless too highly polymerized, are soluble in certain organic solvents, generally in ketones such as acetone, methyl ethyl ketone, diacetone alcohol, cyclohexanone, etc., and these can be used as diluents.

An area of particularly great value of the copolymers of the invention lies in providing resins of improved handling properties for use in applications in which high heat stability and strength are required. The particular epoxy resins heretofore used because they have these properties are high melting solids, and have been found to be extremely hard to handle, to apply (for example, they do not wet surfaces well) and to cure. It has in fact been necessary to use these resins in solution in volatile solvents in most application. The solvents of course introduce many additional problems as compared to a solvent-free, 100 percent solids-forming resin. Thus, for example, bubbles may be trapped adjacent to material coated or encapsulated, the shrinkage caused by the volatilization of solvents during curing may cause undesirable stresses and strains, the solvent vapors may prove to be obnoxious and/or hazardous and create additional problems of vapor recovery or disposal, additional expense is introduced into the system, etc. These difficulties have continued to be major ones in the commercial development of epoxy resins of this type. At the same time, the demand for resins having the characteristics of high heat resistance and great strength has become increasingly larger. They are used as structural adhesives for use in new high performance aircraft, in reinforced plastics used to fabricate aircraft radomes, ducting, structural sections, missile bodies for heated plastic dies, etc.

Certain of the copolymers produced according to the present invention have been found to obviate all of the above-described difficulties in handling, application and curing without sacrificing the needed ultimate properties previously associated only with the difficulty handled, high melting solid epoxy resin prepolymers. Such copolymers can be prepared by dissolving a suitable high-melting solid epoxy resin in a liquid bis-amide, such as, for example, N,N'-bis-1,2-ethylenisosebacamide, adding a catalyst if desired, for example, a latent catalyst of the dihydrazide type. Such resin systems have been found to have excellent handling, application, wetting and curing properties, and, when cured, to have ultimate properties of heat stability, strength, etc. at least equal to those of the corresponding epoxy homopolymers.

Another area for which the copolymers of the present invention appear especially suited is that of laminating resins for rigid plastic tubing. Certain of the bis-amide copolymers, particularly those of the aliphatic bis-amides, have excellent compatibility, processing and curing characteristics. Impact resistance of these copolymers is often much higher than the impact resistance of comparable epoxy resins. Precise mold reproduction is possible because of the extremely low shrinkage during curing and the low temperatures required to cure them. In some cases, harder cured resins result from initially lower viscosity liquid systems, compared with comparable epoxy resins.

In order more clearly to disclose the nature of the copolymers of the present invention, a number of examples illustrating their preparation and evaluation will now be described. It should be understood, however, that this is done solely by way of example of the best mode presently contemplated for carrying out the invention, and is intended neither to delineate the precise scope of the invention nor to limit the ambit of the appended claims. All parts are by weight unless otherwise designated.

III. THE PREPARATION AND UTILITY OF THE COPOLYMERS OF THE INVENTION

Example 1

Three copolymer lots according to the present invention are prepared utilizing the following proportions of ingredients:

|  | Lots | | |
| --- | --- | --- | --- |
|  | A | B | C |
| "Epon 828" epoxy resin [1] | 100 | 100 | 100 |
| N,N'-bis-1,2-ethylensebacamide | 54 | 108 | 216 |
| Pyromellitic dianhydride | 54.4 | 82 | 136 |

[1] A liquid condensation polymer of epichlorohydrin and Bisphenol A having an epoxide equivalent of 175–210, an average molecular weight of 350–400 and a viscosity at 25° C. in the range of from 5,000–15,000 centipoises and which is available commercially from the Shell Chemical Co. of New York.

These resin mixtures are prepared by stirring the finely ground solid bis-amide and catalyst into the liquid epoxy resin at room temperature until a uniform dispersion or slurry is produced.

Three lots of 12 ply glass fiber-reinforced plastic sheets are prepared using these resin mixtures and the resulting reinforced plastics are given the same lot designations as the mixtures from which they are respectively made. The 12 ply laminates are prepared as follows: an excess of the particular resin mixture to be used is applied to a finished glass fabric, the excess is removed and the remaining resin is smoothed and forced into the fabric by pulling it between the nip of two steel bars. The resin coated fabric is then cut and stacked in piles of 12 plies each. These piles are placed between steel platens, previously coated with a silicone-type mold release agent and heated to 155° C. The laminates are then cured between the heated platens in an hydraulic press for 20 minutes at 25 p.s.i., the temperature of the platens being maintained at 155° C. during this time. The laminates are then post-cured for 14 hours at 175° C. in an oven. The following data is obtained from tests run on the resulting laminates:

|  | Lots | | |
| --- | --- | --- | --- |
|  | A | B | C |
| Resin contents (percent) | 38.7 | 35.9 | 40.9 |
| Flexural properties (ASTM D-790-49T): | | | |
| $SF \times 10^{-3}$ | 55.1 | 57.6 | 53.1 |
| $E_B \times 10^{-6}$ | 2.07 | 2.46 | 1.79 |
| Failure [1] | B | B | B |
| Flexural properties (of laminates): | | | |
| At 150° C.: | | | |
| $SF \times 10^{-3}$ | 41.6 | 49.0 | 39.1 |
| $E_B \times 10^{-6}$ | 1.91 | 2.26 | 1.63 |
| Failure [1] | B | B | B |
| At 204° C.: | | | |
| $SF \times 10^{-3}$ | 27.7 | 29.1 | 49.6 |
| $E_B \times 10^{-6}$ | 1.59 | 1.70 | 1.11 |
| Failure [1] | B | B | B |
| At 260° C.: | | | |
| $SF \times 10^{-3}$ | 4.6 | 3.6 | 3.4 |
| $E_B \times 10^{-6}$ | 0.36 | 0.26 | 0.15 |
| Failure [1] | D | D | D |
| Impact and compression strength: | | | |
| Impact Strength (Izod) (ft. lbs./inch) (ASTM D256-56) | 16.6 | 15.9 | 13.2 |
| Ultimate strength in compression (p.s.i.) (ASTM D695-54) | $4.17 \times 10^4$ | $3.6 \times 10^4$ | $2.45 \times 10^4$ |
| Failure [2] | E | B | E |
| Resin loss data after exposure at 260° C.: | | | |
| Resin in Laminates before heating (percent) | 38.7 | 35.9 | 40.9 |
| Resin loss at 16 hrs. (percent) | 16.5 | 15.7 | 16.2 |
| Resin loss at 60 hrs. (percent) | 21.7 | 21.3 | 22.7 |
| Resin loss at 108 hrs. (percent) | 25.3 | 25.6 | 28.1 |
| Effects of heat aging on flexural properties: [3] | | | |

|  | Lots | | |
| --- | --- | --- | --- |
|  | A | B | C |
| Resin in laminates after heating (percent) | 25.2 | 22.5 | 23.1 |
| Percent of resin lost during heating | 34.8 | 37.2 | 43.6 |
| $SF \times 10^{-3}$ | 13.530 | 7.460 | 3.738 |
| $E_B \times 10^{-6}$ | 1.22 | 1.22 | .798 |
| Failure [1] | D | D | D |

[1] Failure of specimens: B, break; D, delamination.
[2] Failure: B, break in body of specimen; E, edge failure.
[3] These tests run at room temperature after heating laminates 228 hrs. at 260° C.

NOTE.—SF is the flexural strength or modulus of rupture and $E_B$ is the modulus of elasticity in bending of the laminates.

Example 2

A mixture of about 12.4 grams of N,N'-bis-1,2-ethylensebacamide, 37.4 grams of epoxy resin which is a liquid condensation polymer of epichlorohydrin and bisphenol A having an epoxide equivalent of 185–200, an average molecular weight of 350–400 and a viscosity at 25° C. in the range of from 10,500 to 19,500 centipoises (and which is available commercially under the trademark "ERL–2774" from the Bakelite Co., a division of Union Carbide and Carbon Corporation), 43.7 grams of a polyalkylene polysulfide prepolymer which is a thiol-terminated liquid polymer of bis(ethylene oxy)methane having a viscosity at 25° C. of 7–12 poises, a number average molecular weight of 1,000 and a pour point of —15° F. (which is available commercially under the trade designation of "LP–3" from the Thiokol Corporation of Trenton, New Jersey), and 6.5 grams of triethylene tetramine is provided. The mixture is prepared as follows: first, the bis-amide is dissolved in the epoxy resin with stirring and mild heating. The triethylene tetramine is then dissolved at room temperature in the polyalkylene polysulfide prepolymer and the two liquid solutions are mixed together with agitation. The ingredients of the system react and cure at room temperature, and after mixing are promptly poured into a mold. Within a few hours this liquid resin system has cured tack-free. At the end of 24 hours it is found to have a hardness, measured on the Shore A-2 scale, (ASTM D676–55T) of 46. The resin is light yellow in color and exhibits good mold reproduction, flexibility and toughness.

Example 3

About 6.3 grams of N,N'-bis-1,2-ethylensebacamide are stirred into 10 grams of "ERL-2774" epoxy resin previously warmed to 65° C. and agitation is continued until the bis-amide has dissolved in the epoxy resin. 4.07 grams of calcium carbonate filler are then mixed into the warm resin solution and the resulting mixture is cooled to room temperature. Finally 2 grams of melted m-phenylene diamine are added to the mixture with agitation. Agitation is stopped, the mixture is poured into a mold and is heated for 1 hour at 125° C. The resulting rigid, tan-colored resin is designated as lot A.

A second lot of resin, designated as lot B, consisting of 10 grams of "ERL-2774" epoxy resin, 6.3 grams of N,N'-bis-1,2-ethylenesebacamide, 8.16 grams of calcium carbonate filler and 3 grams of m-phenylene diamine is prepared and cured by the same procedure.

The results of hardness tests run on these samples are as follows:

|  | Lots | |
| --- | --- | --- |
|  | A | B |
| Hardness, Rockwell (L-scale) (ASTM D785-51) | 110 | 102 |
| Hardness, Shore (D-scale) (ASTM D-1485-57T) at: | | |
| 25° C | 78 | 80 |
| 95° C | 78 | 78 |
| 110° C | 76 | 74 |
| 130° C | 51 | 72 |

Example 4

About 5.0 grams of adipyl dihydrazide are dispersed in a solution of 6.3 grams of N,N'-bis-1,2-ethylensebacamide in 10 grams of "ERL–2774" epoxy resin, placed in a mold and cured for 1 hour at 125° C. The resulting transparent, light yellow casting has a hardness (Rockwell L) of 106 and a heat distortion temperature (ASTM D648–45T) of approximately 66° C.

Example 5

A mixture of 14.05 grams of N,N'-bis-1,2-ethylensebacamide, 42.25 grams of "ERL–2774" epoxy resin, 0.45 gram of resorcinol, 37.60 grams of polyalkylene polysulfide prepolymer "LP–3" and 5.65 grams of tridimethyl amino methyl phenol is prepared. The bis-amide is dissolved in the epoxy resin with stirring and mild heating after which the resorcinol is added and dissolved. The tridimethyl amino methyl phenol is mixed into the polyalkylene polysulfide prepolymer and the two liquid fractions are then combined with agitation, placed in a mold and allowed to cure at room temperature. The system is tack-free in 15 minutes. After 24 hours at room temperature a transparent, amber-colored resin having a Shore A–2 hardness value of 64 has been formed.

Example 6

About 3 grams "Epon 828" epoxy resin, 3 grams of N,N'-bis-1,2-ethylenisosebacamide and 0.8 gram of diethylene triamine are mixed thoroughly at room temperature. The resulting mixture cures to a hard, tough resin in 50 minutes at room temperature.

Example 7

About 100 parts of N,N'-bis-1,2-ethylenisosebacamide and 200 parts of "Epon 828" epoxy resin are mixed thoroughly at room temperature. The mixture is heated to 50° C. and 12 parts of a 75 percent solids solution of boron trifluoride-monoethylamine in acetone (75 parts of boron trifluoride-monoethylamine complex and 25 parts of acetone) are added with continuing agitation. The initial viscosity of the resulting mixture is 450 centipoises at 25° C. (when measured on a Brookfield viscometer) and its pot life is in excess of 18 hours at ambient temperature. It cures in 2½ hours at 121° C. to a slightly tacky, amber-colored resin.

A similar result is obtained when the procedure is repeated utilizing 20 parts of the boron trifluoride monoethylamine-acetone solution.

Example 8

About 100 parts of a finely ground epoxy resin which is a brown solid condensation polymer of epichlorohydrin and the tetra-bis-phenol reaction product of phenol and glyoxal having a melting point of 77° C. (Durran's), an epoxide equivalent of 208 and an average molecular weight of 77 (which is commercially available under the trademark "Epon 1310" from the Shell Chemical Company of New York), are stirred into 100 parts of N,N'-bis-1,2-ethylenisosebacamide. The resulting resin solution is used to prepare a 12-ply glass fiber-reinforced laminated sheet using the procedure and glass fabric disclosed in Example 1. The laminate is cured in a hydraulic press with heated platens for 20 minutes at 155° C. and 25 pounds per square inch pressure and then postcured for 14 hours at 175° C. The following data are obtained from tests made on this laminate.

Resin content (percent) _____ 35.2
Flexural properties (of laminate):
  At 25° C.—
    $SF \times 10^{-3}$ _____ 66.1
    $E_B \times 10^{-6}$ _____ 2.19
    Failure [1] _____ B
  At 150° C.—
    $SF \times 10^{-3}$ _____ 39.6
    $E_B \times 10^{-6}$ _____ 1.96
    Failure [1] _____ B Flexural properties (of laminate)—Continued
  At 204° C.—
    $SF \times 10^{-3}$ _____ 21.2
    $E_B \times 10^{-6}$ _____ 1.64
    Failure [1] _____ B and D
  At 260° C.—
    $SF \times 10^{-3}$ _____ 11.0
    $E_B \times 10^{-6}$ _____ 1.20
    Failure _____ D
Resin loss data after exposure at 260° C.:
  Resin in laminate before heating (percent) _____ 35.2
  Resin loss at 16 hrs. (percent) _____ 8.49
  Resin loss at 60 hrs. (percent) _____ 12.5
  Resin loss at 132 hrs. (percent) _____ 16.0
Flexural properties (these tests run at room temperature after heating laminates 204 hrs. at 260° C.):
  Resin in laminate after heating (percent) __ 27.63
  Percent of resin lost during heating _____ 21.5
  $SF \times 10^{-3}$ _____ 20.528
  $E_B \times 10^{-6}$ _____ 2.27
  Failure [1] _____ D

[1] Failure of specimens: B, break; D, delamination.

Example 9

About 50 parts of "Epon 1310" epoxy resin, 50 parts of N,N'-bis-1,2-ethylenisosebacamide and 27 parts of 4,4'-diamino diphenylsulfone are mixed thoroughly with heating and the resulting low-viscosity liquid resin system is poured into an open mold and cured by heating for 2 hours at 120° C., to a bubble-free casting of a dark-colored solid resin having a hardness (Rockwell) of M–100. A relative test of the lowest temperature at which the resin fails to resist plastic flow under an applied load consists in measuring the temperature at which a weighted bar will deform a cured resin specimen having uniform rectangular cross section of 0.5″ x 0.625″. The resin specimen is placed in a temperature controlled test chamber and a ½″ diameter bar bearing a load of 3 pounds is placed against the sample and the bar is ½″. The bar begins to deform this resin sample at a temperature of 145° C., thus indicating excellent resistance to plastic flow at elevated temperatures. The temperature at which deformation begins in this test will sometimes be referred to herein as "modified heat deformation point."

About 100 parts of finely ground "Epon 1310" epoxy resin are added to 100 parts of N,N'-bis-1,2-ethylenisosebacamide with agitation and at a temperature of about 80° C. This mixture is cooled and 54 parts of 4,4'-diamino diphenylsulfone are added with agitation. When the resulting slurry has become uniform, it is poured into an aluminum mold which had been previously coated with a silicone mold release agent. This mixture is then cured for 3½ hours at 65° C., 1½ hours at 85° C., 13 hours at 120° C., 24 hours at 178° C. and 1 hour at 204° C. The following data are obtained from tests run on this resin.

Physical properties:
  Tensile strength (p.s.i.) (ASTM D638–56T) _____ [1] 6,280
  Elongation (percent) (ASTM D638–56T) _____ [1] 0.058
  Modulus in tension (p.s.i.) (ASTM D638–56T) _____ $5.0 \times 10^6$
  Flexural strength (p.s.i.) (ASTM D790–49T) _____ 13,824
  Modulus in flexure (p.s.i.) (ASTM D790–49T) _____ $0.48 \times 10^6$
  Compressive strength (p.s.i.) (ASTM D695–54) _____ 34,600
  Modulus in compression (p.s.i.) (ASTM D695–54) _____ $6.41 \times 10^4$ Physical properties—Continued

| | |
|---|---|
| Compressive strain at failure (percent) (ASTM D695–54) | 17.2 |
| Compressive yield stress (p.s.i.) (ASTM D695–54) | (2) |
| Compressive yield strain (percent) (ASTM D695–54) | (2) |
| Impact strength (Izod) (ft. lbs./in.) | 0.32 |
| Hardness, Rockwell | E–73 |
| Heat distortion (° C.) | 176 |

Electrical properties:

| | |
|---|---|
| Dissipation factor (1 kc.) (ASTM D150–54T) | 0.0102 |
| Dielectric constant (1 kc.) (ASTM D150–54T) | 4.23 |

Aging properties:

| | |
|---|---|
| Water absorption, 24 hr. (percent) (ASTM D570) 30° C. | .260 |
| Water absorption, 1 week (percent) 30° C. | 0.793 |
| Weight loss (200 hrs./500° F.) (percent) | 15.2 |

[1] Jaw break.
[2] No yield point.

*Example 10*

About 100 parts of finely ground "Epon 1310" epoxy resin are added to 100 parts of N,N'-bis-1,2-ethylenisosebacamide with agitation and at a temperature of about 80° C. This solution is cooled and 2 parts of boron trifluoride monoethylamine are added with agitation and the resulting mixture is poured into a mold. The mixture is cured for 2 hours at 80° C. and 2 hours at 90° C. in a vacuum oven, then 16 hours at 85° C., 1 hour at 150° C., 42 hours at 178° C. and 1 hour at 204° C. at atmospheric pressure. The following data are obtained from tests run on this resin.

Physical properties:

| | |
|---|---|
| Tensile strength (p.s.i.) | 4,036 |
| Elongation (percent) | 0.084 |
| Modulus in tension (p.s.i.) | $6.72 \times 10^6$ |
| Flexural strength (p.s.i.) | 9,072 |
| Modulus in flexure (p.s.i.) | $4.45 \times 10^5$ |
| Compressive strength (p.s.i.) | 43,100 |
| Modulus in compression (p.s.i.) | $5.49 \times 10^5$ |
| Compressive strain at failure (percent) | 18.2 |
| Compressive yield stress (p.s.i.) | (1) |
| Compressive yield strain (percent) | (1) |
| Impact strength (Izod) (ft. lbs./in.) | 0.28 |
| Rockwell hardness | E–74 |
| Heat distortion temperature (° C.) | 195 |

Electrical properties:

| | |
|---|---|
| Dissipation factor (1 kc.) | 0.0624 |
| Dielectric constant (1 kc.) | 4.44 |

Aging properties:

| | |
|---|---|
| Water absorption, 24 hrs. (percent) | 0.370 |
| Water absorption, 1 week (percent) | 1.07 |

[1] No yield point.

A copolymer consisting of 100 parts of "Epon 1310" epoxy resin, 100 parts of N,N'-bis-1,2-ethylenisosebacamide and 4 parts of boron trifluoride-monoethylamine is prepared. The finely ground epoxy resin is stirred into the liquid bis-amide and agitation is continued, with moderate heating, until solution is complete, after which the boron trifluoride-monoethylamine is added and dissolved, the agitation and moderate heating being continued. The resulting liquid resin system is utilized to prepare a 12 ply glass fiber-reinforced plastic laminated sheet using the procedure and glass fabric disclosed in Example 1 hereof. The resin, however, is maintained at about 40° C. while saturating the glass fabric. The laminate is cured in a hydraulic press with heated platens for 20 minutes at 155° C. and 25 p.s.i. and then postcured for 4 hours at 120° C. and 14 hours at 175° C. The following data is obtained from tests run on these laminates.

| | |
|---|---|
| Resins content (percent) | 36.7 |

Flexural properties (of laminates):

At 25° C.:

| | |
|---|---|
| $SF \times 10^{-3}$ | 64.2 |
| $E_B \times 10^{-6}$ | 2.22 |
| Failure [1] | B |

At 150° C.:

| | |
|---|---|
| $SF \times 10^{-3}$ | 35.9 |
| $E_B \times 10^{-6}$ | 1.86 |
| Failure [1] | B |

At 204° C.:

| | |
|---|---|
| $SF \times 10^{-3}$ | 21.2 |
| $E_B \times 10^{-6}$ | 1.34 |
| Failure [1] | B |

At 260° C.:

| | |
|---|---|
| $SF \times 10^{-3}$ | 13.1 |
| $E_B \times 10^{-6}$ | 1.43 |
| Failure [1] | D |

Resin loss data after exposure at 260° C.:

| | |
|---|---|
| Resin in laminate before heating (percent) | 36.7 |
| Resin loss at 16 hrs. (percent) | 5.94 |
| Resin loss at 60 hrs. (percent) | 10.7 |
| Resin loss at 108 hrs. (percent) | 13.4 |

Flexural properties (of laminate) these tests run at room temperature after heating laminate 228 hrs. at 260° C.:

| | |
|---|---|
| Resin in laminate after heating (percent) | 29.98 |
| Percent of resin lost during heating | 18.3 |
| $SF \times 10^{-3}$ | 15.594 |
| $E_B \times 10^{-6}$ | 2.29 |
| Failure [1] | D |

[1] Failure of specimens: B, break; D, delamination.

*Example 11*

About 5.0 grams of adipyl dihydrazide are dispersed in a solution of 6.3 grams of N,N'-bis-1,2-ethylenisosebacamide and 10 grams of "ERL–2774" epoxy resin. This solution is poured into a mold and cured for 1 hour at 125° C. and 20 minutes at 180° C., and forms a rigid resin. The heat distortion temperature of this resin is approximately 85° C.

*Example 12*

About 4.86 grams of isophathalyl dihydrazide are dispersed in a solution of 6.3 grams of N,N'-bis-1,2-ethylenisosebacamide in 10 grams of "ERL–2774" epoxy resin. This dispersion is quite stable and can be stored for periods of up to 1 month at room temperature without appreciable change in viscosity.

A ½ inch thick piece of plate glass is coated with this resin and a second piece of glass is carefully pressed against the resin coating to avoid the entrapment of air. The resulting laminate is then cured at contact pressure for 1 hour at 130° C. and ½ hour at 180° C. The cured laminate is transparent and resists a tensile stress of 1,000 pounds per square inch applied in a direction perpendicular to the plane of the glass-adhesive bond.

*Example 13*

About 50 parts of N,N'-bis-1,2-ethylenisosebacamide and 10 parts of "Epon 828" epoxy resin are mixed thoroughly at room temperature and the mixture is heated to 80° C. with agitation. Forty parts of crushed "Epon 1310" epoxy resin are added slowly with agitation and the mixture is cooled to 50° C. Five parts of boron trifluoride-monoethylamine are added as a 75 percent solids solution in acetone with continuing agitation. The initial viscosity of the resulting mixture is 620 centipoises at 25° C. (when measured on a Brookfield viscometer). The temperature of the mixture is maintained at 25° C. and its viscosity is measured after various time intervals as follows: After 1¼ hours the viscosity of the mixture is 1800 centipoises, after a total of 2 hours the viscosity is 2480 centiposes, after a total of 6 hours the viscosity is 4600 centipoises and after a total of 23 hours the viscosity is 40,000 centipoises. After an additional cure cycle of 2 hours at 121° C. the mixture has formed a hard, brown colored resin.

About 50 parts of N,N'-bis-1,2-ethylenisosebacamide and 30 parts of "Epon 828" epoxy resin are mixed thoroughly at room temperature and the mixture is heated to 80° C. with agitation. Twenty parts of crushed "Epon 1310" epoxy resin are added and the mixture is cooled at 50° C. Five parts of boron trifluoride-monoethylamide (in a 75 percent solids solution in acetone) are added with continuing agitation. The initial viscosity of the resulting mixture is 700 centipoises at 25° C. (when measured on a Brookfield viscometer). It cures in 3 hours at 121° C. to a hard, brown colored resin.

The previous preparation is repeated except that 25 parts of powdered calcium carbonate filler are added. The initial viscosity of this mixture is found to be 1000 centipoises and it also cures to a hard, medium brown-colored resin.

About 50 parts of N,N'-bis-1,2-ethylenisosebacamide and 40 parts of "Epon 828" epoxy resin are mixed thoroughly at room temperature and the mixture is heated to 80° C. with agitation. Ten parts of crushed "Epon 1310" epoxy resin are added and the mixture is cooled to 50° C. Five parts of boron trifluoride monoethylamine (in a 75 percent solids solution in acetone) are added with continuing agitation. The initial viscosity of the resulting mixture is 260 centipoises at 25° C. (when measured on a Brookfield viscometer). It cures in 3½ hours at 120° C. to a hard, light brown resin.

The previous preparation is repeated except that 25 parts of powdered calcium carbonate filler are also added. The initial viscosity of the resulting mixture is 500 centipoises and it also cures to a hard, light brown resin.

*Example 14*

About 50 parts of N,N'-bis-1,2-ethylenisosebacamide and 10 parts "Epon 828" epoxy resin are mixed thoroughly at room temperature and the mixture is heated to 80° C. with agitation. Forty parts of crushed "Epon 1310" epoxy resin are added and the mixture is cooled to 50° C. Three parts of boron trifluoride-monoethylamine and 10 parts of pyromellitic dianhydride are added in finely divided form with continuing agitation. The resulting mixture is quite reactive and has a pot life of approximately 1 minute after mixing. It cures to a hard, dark brown resin. For use, the mixture of resins is placed in the mold and the curing agents are added thereto with stirring. An exotherm is noted during curing.

*Example 15*

Monomeric polychlorophenyl-bis(4-glycidoxy-phenyl)-methane is prepared as follows:

A. In a vessel provided with external heating means, addition device, thermometer, mechanical agitator and efficient reflux condenser attached to a gas absorption system are placed 6110 parts (45.3 moles) of technical sulfuryl chloride, 62 parts of sulfur monochloride and 19 parts of anhydrous aluminum chloride (analytical reagent grade). The addition device is charged with 800 parts (4.87 moles) of benzal chloride and addition thereof is commenced with vigorous agitation of the contents of the vessel and circulation of ice-cold water in the condenser. Moderate heating is applied so that the temperature in the vessel reaches about 41° C. and further rises to about 43° C. during the beginning of the addition. Addition is at a rate such that about 200 minutes are required in all and the temperature is then at about 35° C. The copious volumes of gas evolved, comprising $SO_2$, HCl and some $Cl_2$, are absorbed in the gas absorption system. At the end of the addition the reaction mixture is heated first to 55° C. in about 100 minutes and then gradually to 60° C. during about 7.5 hours further. The mixture is then distilled at reduced pressure, first at about 650 mm. Hg and then at about 25 mm. Hg pressure until the contents of the vessel reaches 70° C. and most of the unreacted sulfuryl chloride has been removed.

The reaction mixture is then quenched in 8000 parts of boiling water employing steam to effect agitation during the quenching. The strongly acidic aqueous layer is decanted and the heavy oily organic layer is washed first by repeated steaming with a further 8000 parts of boiling water and then is washed successively with about 1000 parts of about 5 percent aqueous sodium bicarbonate solution and about 1000 parts of water at about 50° C. About 350 parts of chloroform are added to the oily layer after separation from the last aqueous wash and the resulting chloroform solution is dried by agitation successively with 25 parts each of anhydrous magnesium sulfate and anhydrous potassium carbonate. The dried chloroform solution is separated and distilled at temperatures increasing up to 100° C. at 5 mm. Hg pressure to remove the chloroform. The residual 1470 parts of yellowish oil has $n_D^{25}=1.6157$ and largely crystallizes on standing at room temperature. The melting point of the mixture is not sharp as it consists of a mixture of tri-, tetra- and penta-chlorobenzal chlorides together with various by-products of the reaction such as benzene hexachloride.

*Analysis.*—Calculated for $C_7H_2Cl_6$: Cl, 71.2 percent. Found: Cl, 70.4 percent.

The empirical formula is calculated to average about $C_7H_{2.3}Cl_{5.7}$.

B. *Preparation of polychlorobenzaldehyde.*—A vessel arranged for external heating and fitted with thermometer, mechanical agitator and exhaust line to a gas absorption system is charged with 9000 parts of 96 percent sulfuric acid (reagent grade) and 1470 parts of the polychlorobenzal dichloride of Example A and is then heated rapidly with agitation to about 80° C. The vigorous evolution of hydrogen chloride is controlled by reducing the rate of stirring. More heat is applied as needed to maintain the temperature at about 80° to 85° C. for 1 hour and then to raise the temperature to about 100° to 105° C. where it is maintained for a further five hours. The reaction mixture is then cooled slowly with gentle agitation to permit the formation of a granular precipitate comprising the unhydrolyzable contaminants such as benzene hexachloride which are then collected. The clear filtered solution is poured into a large excess of cracked ice and the precipitated polychlorobenzaldehyde is collected, washed repeatedly with several volumes of warm water, with about 5 percent aqueous sodium carbonate solution, and again with warm water and collected. The polychlorobenzaldehyde is dried in a circulating oven at 40° to 45° C. to furnish 926 parts of light tan powder having a melting point range of 100° to 105° C. A further yield can be obtained by repeating the process with the unhydrolyzable material consisting mainly of benzene hexachloride recovered above, which also contains an amount of unhydrolyzed polychlorobenzal chloride, the polychlorobenzaldehyde thus prepared is found to be a mixture of tri, tetra- and penta-chlorobenzaldehydes.

*Analysis.*—Calculated for $C_7H_2Cl_4O$: Cl, 58.2 percent. Found: Cl, 58.4 percent.

C. *Preparation of polyhaloaryl bisphenol.*—In a vessel provided with external steam heating and fitted with thermometer, mechanical agitation and an exhaust port are placed 1740 parts (18.5 moles) of phenol, 110 parts of water, 800 parts of 96 percent sulfuric acid and about 3 parts of thioglycollic acid. To this mixture are added in portions 650 parts (2.2 moles calculated as tetra-chlorobenzaldehyde) of the polychlorobenzaldehyde of Example B (ground to a 20 mesh size) over a period of 1 hour while maintaining the temperature at about 40°

C. by external cooling when needed. After stirring for another hour, the reaction mixture is heated to about 65° to 70° C. and maintained there for about a further hour. At this time a test sample of the thick syrupy reaction mixture is found to be completely soluble in an excess of dilute sodium hydroxide and the reaction mixture is diluted with 200 parts of water and steam-distilled to remove unreacted phenol. The tacky brown lumps which form are separated from the acidic aqueous layer and dissolved by boiling with four successive 3000 part portions of about 1 to 2 percent aqueous sodium hydroxide. A small amount of tarry residue remains on the walls of the vessel and is discarded. The four alkaline solutions are combined and neutralized to a pH of about 8.5 by addition of an excess of powdered solid carbon dioxide with vigorous stirring. The product, which consists of a mixture of the tri-, tetra-, and pentachlorophenyl bis-(4-hydroxyphenyl) methanes thus prepared, is precipitated in a readily filterable form and is collected, washed with cold water and dried at about 65° C. It has a melting point of about 185° to 190° C. and on analysis is found to contain 31.1 percent of chlorine.

D. *Preparation of a glycidyl polyether of polychlorophenyl bisphenol.*—In a vessel provided with external heating and fitted with addition funnel, stirrer, thermometer and reflux condenser are placed 900 parts (3.82 equivalents by titration) of the polychlorophenyl-bisphenol of Example C and 2,090 parts (22.6 moles) of commercial epichlorohydrin and this mixture is heated to refluxing (about 95° C.). A solution of 163 parts (4.07 moles) of sodium hydroxide in 820 parts of anhydrous methanol is added to the vessel during about 2 hours and heating and stirring is continued for 2 hours longer. After cooling to room temperature, the reaction mixture is filtered to remove the precipitate of sodium chloride which forms and the filtrate is distilled at temperatures increasing to 120° C., at 0.5 mm. Hg pressure, to remove methanol and unreacted epichlorohydrin. The clear brown residual resin is readily pulverized on cooling and is substantially tack-free, i.e. the powder does not clump. This prepolymer consists essentially of polychlorophenyl-bis(4-glycidoxy-phenyl)-methane and is a mixture of the tri-, tetra- and penta-chloro compounds. It contains 5.3 percent oxirane oxygen and 29.1 percent chlorine and has the molecular weight 621, as determined ebullioscopically in benzene. It softens to a flowable material at about 95° C.; Durran's mercury method melting point is about 75° C.

About 100 parts of polychlorophenyl-bis(4-glycidoxy-phenyl)-methane and 100 parts of N,N'-bis-1,2-ethylenisosebacamide are blended together while being warmed sufficiently to form a solution and 2 parts of boron trifluoride monoethylamine are subsequently added. The resulting mixture is poured into an open mold and cured for ½ hour at 150° C. and 17 hours at 177° C. to form a hard, resilient, tough, transparent, and reddish-brown casting. Its flexural modulus at room temperature is $4.0 \times 10^5$ and its hardness on the Rockwell L scale is 111.

A 12 ply glass fiber-reinforced plastic laminate is prepared from this resin composition using the procedure and glass fabric disclosed in Example 1. The laminate is then cured in a hydraulic press for 2 hours at 300° F. and 400 pounds per square inch pressure and then postcured for 19 hours at 250° F. The following data is obtained from tests run on this laminate.

Flexural properties:
  23–25° C.:
    $SF \times 10^{-3}$ ---- 88
    $E_B \times 10^{-6}$ ---- 4.2
  100° C.:
    $SF \times 10^{-3}$ ---- 75
    $E_B \times 10^{-6}$ ---- 6.9
  150° C.:
    $SF \times 10^{-3}$ ---- 27.5
    $E_B \times 10^{-6}$ ---- 4.9
  220° C.:
    $SF \times 10^{-3}$ ---- 14
    $E_B \times 10^{-6}$ ---- 4.6
Impact strength (Izod) (ft. lbs./inch):
  Normal to laminate ---- 30
  Parallel to laminate ---- 60
Tensile strength at 25° C. (p.s.i.) ---- 20,000
Resin loss after exposure for 2 hrs. at 260° C. (percent) ---- 1.54

*Example 16*

About 100 parts of triglycidyl cyanurate (a white, crystalline product which melts between 30° and 50° C. and which is prepared by the method disclosed in U.S. Patent 2,741,607, are melted and mixed thoroughly with 100 parts of liquid N,N'-bis-1,2-ethylenisosebacamide. Four parts of finely ground boron trifluoride monoethylamine are then added with agitation. The resulting mixture, a low viscosity liquid at room temperature, is cured for 64 hours at 250° F. The resulting hard, rigid resin has a hardness (Rockwell) of M-110. The modified heat deformation point of this resin (run according to the test explained in Example 9 hereof) is above 220° C.

*Example 17*

About 108 parts of N,N'-bis-1,2-propylenisosebacamide are mixed thoroughly with 100 parts of "Epon 828" epoxy resin and 27 parts of metaphenylene diamine are then added with agitation. The resulting mixture, which has a pot life at ambient temperatures of approximately 3 hours, cures in 4 hours or less at 121° C. to a hard, brownish-black resin.

*Example 18*

About 100 parts of N,N'-bis-1,2-propylenisosebacamide and 100 parts of "Epon 828" epoxy resin are mixed thoroughly and 12 parts of menthane diamine are added with continuing agitation. The resulting mixture is found to have a pot life of from 4 to 5 hours at ambient temperatures. When coated on a metal panel this material cures in 20 minutes at 250° F. to a clear colorless to slightly yellow tack-free resin.

*Example 19*

About 108 parts of N,N'-bis-1,2-propylenisosebacamide are mixed thoroughly with 100 parts of "Epon 828" epoxy resin and 61.5 parts of 4,4'-diamino diphenylsulfone are added with continuing agitation. The resulting rather highly viscous mixture is found to have a pot life of from 6 to 8 hours at ambient temperatures. It cures in 18 hours at 250° F. to a hard, dark colored resin.

*Example 20*

Three copolymer lots according to the present invention are prepared utilizing the following proportions of ingredients:

| | Lots | | |
|---|---|---|---|
| | A | B | C |
| "Epon 828" | 100 | 100 | 100 |
| N,N'-bis-1,2-ethylenisophthalamide | 108 | 108 | 108 |
| Isophthalyl dihydrazide | 24.2 | 48.5 | 72.8 |
| Dicyandiamide | 2.3 | 4.2 | 4.2 |
| Primary hydrogen-ring ratio [1] | 1/3 | 2/3 | 1/1 |
| Azirane-oxirane ratio [2] | 2/1 | 2/1 | 2/1 |

[1] The calculated ratio of equivalents of primary amine hydrogen of the isophthalyldihydrazide to the total number of equivalents of oxirane and aziridine rings.
[2] The calculated ratio of aziridine ring to oxirane ring.

The "Epon 828" epoxy resin, the isophthalyl dihydrazide and the dicyandiamide constitutents of these lots are first milled together on a paint mill and the N,N'- bis-1,2-ethylenisophthalamide is then mixed with the other constituents at about 80° C. with rapid agitation.

Three lots of 12 ply glass fiber-reinforced plastic laminates are prepared using these resins and the resulting reinforced plastics are given the same lot designations as the resins from which they are respectively made. The laminates are prepared by the process and using the glass fabric described in Example 1 hereof. No postcure is given to these lots except as indicated in the tables below. The following data is obtained from tests run on these laminates:

|  | Lots | | |
| --- | --- | --- | --- |
|  | A | B | C |
| Resin contents (percent) | 36.1 | 40.9 | 38.5 |
| Flexural properties of laminates: | | | |
| Post cured 1 hr. at 177° C.: | | | |
| At 25° C.: | | | |
| $SF \times 10^{-3}$ | 70.8 | 92.2 | 70.9 |
| $E_B \times 10^{-6}$ | 3.1 | 4.6 | 3.3 |
| At 150° C.: | | | |
| $SF \times 10^{-3}$ | 34.2 | 41.1 | 41.8 |
| $E_B \times 10^{-6}$ | 2.5 | 2.6 | 2.8 |
| At 230° C.: | | | |
| $SF \times 10^{-3}$ | 13.8 | 10.0 | 6.5 |
| $E_B \times 10^{-6}$ | 1.5 | 1.6 | 1.2 |
| Post cured 5 hr. at 177° C.: | | | |
| At 25° C.: | | | |
| $SF \times 10^{-3}$ | 69.1 | 74.5 | 76.8 |
| $E_B \times 10^{-6}$ | 3.67 | 4.42 | 3.93 |
| At 150° C.: | | | |
| $SF \times 10^{-3}$ | 63.0 | 70.3 | 57.6 |
| $E_B \times 10^{-6}$ | 3.28 | 4.10 | 3.11 |
| At 230° C.: | | | |
| $SF \times 10^{-3}$ | 12.3 | 20.0 | 6.1 |
| $E_B \times 10^{-6}$ | 1.80 | 2.54 | 1.15 |
| Post cured 13 hr. at 177° C.: | | | |
| At 205° C.: | | | |
| $SF \times 10^{-3}$ | 21.5 | 17.6 | 10.0 |
| $E_B \times 10^{-6}$ | 2.04 | 2.21 | 1.31 |
| Density (g/cc) | 1.84 | 1.72 | 1.77 |
| Heat distortion temperature (° C.) | 272 | 275 | 270 |
| Heat penetration temperature (° C.) [1] | 274 | 259 | 240 |
| Impact strength Izod (ft. lbs./inch) | 18.34 | 14.87 | 14.11 |
| Resin loss data after exposure at 260° C.: | | | |
| Resin loss at 16 hrs. (percent) | 14.65 | 15.10 | 18.28 |
| Resin loss at 50 hrs. (percent) | 19.13 | 19.49 | 21.10 |
| Effects of heat aging on flexural properties of laminates (tests run at rm. temperature after being heated as follows:) | | | |
| No heat cycle: | | | |
| $SF \times 10^{-3}$ | 70.8 | 92.2 | 70.9 |
| $E_B \times 10^{-6}$ | 3.11 | 4.59 | 3.28 |
| 16 hours at 260° C.: | | | |
| $SF \times 10^{-3}$ | 14.2 | 24.6 | 51.5 |
| $E_B \times 10^{-6}$ | 4.25 | 4.56 | 3.60 |
| 50 hours at 260° C.: | | | |
| $SF \times 10^{-3}$ | 22.6 | 24.4 | 52.6 |
| $E_B \times 10^{-6}$ | 4.47 | 5.65 | 3.68 |

[1] The heat penetration temperature is determined as follows: The resin sample is immersed in a silicone oil bath. A one kilogram load is applied to the sample through a 1 sq. millimeter bearing surface. The oil is heated at the rate of 2° C. per minute and the temperature at which bearing surface begins to penetrate the sample is reported.

*Example 21*

A bis-amide:epoxy-resin copolymer prepared according to the present invention is compared (at two levels of cure) with a conventional epoxy resin formulation to indicate some of the improved properties of the former. The compositions are prepared by stirring the constituents together at about 80° C. until they are thoroughly mixed (approximately 5 minutes).

| Composition | Lots | | | |
| --- | --- | --- | --- | --- |
|  | C | B | C | D |
| N,N'-bis-1,2-ethylenisophthalamide |  |  | 50 | 50 |
| "Epon 828" epoxy resin | 100 | 100 | 50 | 50 |
| Boron trifluoride monoethylamine | 2 | 2 | 2 | 2 |
| Cure cycle (hours): | | | | |
| At 65° C | 2 | 2 | 2 | 2 |
| At 95° C | 1½ | 1½ | 1½ | 1½ |
| At 150° C | 2 | 17 | 2 | 17 |
| Physical properties: | | | | |
| Hardness, Rockwell R | 90 | 94 | 94 | 96 |
| Heat penetration temperature (° C.) |  | 79 | 111 | 158 |
| Aging properties: Weight loss, 500° F. 16 hrs. (percent) |  | 6.32 |  | 5.28 |

In another preparation, about 100 parts of "Epon 828" epoxy resin, 216 parts of N,N'-bis-ethylenisophthalamide and 6.3 parts of boron trifluoride monoethylamine are combined by the same method and a 12 ply glass fiber-reinforced plastic laminate is prepared according to the procedure of Example 1 hereof utilizing this resin. The laminate is then cured in a hydraulic press with heated platens for 20 minutes at 155° C. at 25 pounds per square inch and then postcured for 14 hours at 175° C. The following data is obtained from tests run on this laminate.

Resin contents (percent) _____ 27

Flexural properties (of laminates):
  At 25° C.:
    $SF \times 10^{-3}$ _____ 72.9
    $E_B \times ^{-6}$ _____ 2.80
    Failure [1] _____ B
  At 150° C.:
    $SF \times 10^{-3}$ _____ 59.4
    $E_B \times 10^{-6}$ _____ 2.84
    Failure [1] _____ B
  At 204° C.:
    $SF \times 10^{-3}$ _____ 34.3
    $E_B \times 10^{-6}$ _____ 1.86
    Failure [1] _____ B
  At 260° C.:
    $SF \times 10^{-3}$ _____ 12.7
    $E_B \times 10^{-6}$ _____ 1.43
    Failure [1] _____ B, D Resin loss data after exposure at 260° C.:
  Resin loss at 16 hrs. (percent) _____ 8.00
  Resin loss at 60 hrs. (percent) _____ 15.9
  Resin loss at 108 hrs. (percent) _____ 21.8

Effects on heat aging on flexural properties (of laminate) (these tests run at room temperature after heating laminate 200 hrs. at 260° C.):
  Resin in laminate after heating (percent) ____ 20.0
  Percent of resin lost during heating _____ 32.9
  $SF \times 10^{-3}$ (p.s.i.) _____ 20.67
  $E_B \times 10^{-6}$ (p.s.i.) _____ 2.59
  Failure [1] _____ D

[1] Failure of specimens: B, break; D, delamination.

*Example 22*

About 100 parts of solid N,N'-bis-1,2-etheyleniso-phthalamide are dissolved in 100 parts of "Epon 828" liquid epoxy resin at a slightly elevated temperature and 24.25 parts of isophthalyl dihydrazide (previously ground to a fine powder) are dispersed in the liquid resin mixture. A finished glass fabric is then knife-coated with this resin at approximately 150° F. and the coated fabric is formed into a 16 ply laminate by heating 16 layers of coated fabric for 2 minutes at 310° F. uner contact pressure and then in a heated hydraulic press for 20 minutes at 310° F. at 25 p.s.i. and finally post-curing for 40 hours at 250° F. The following data are obtained from tests run on this laminate.

Resin content, percent _____ 32
Flexural properties (of laminate):
  At 25° C.:
    $SF \times 10^{-3}$ _____ 97.5
    $E_B \times 10^{-6}$ _____ 5.7
  At 150° C.:
    $SF \times 10^{-3}$ _____ 41.4
    $E_B \times 10^{-6}$ _____ 3.0
  At 230° C.:
    $SF \times 10^{-3}$ _____ 14.9
    $E_B \times 10^{-6}$ _____ 2.3
Heat distortion temperature, ° C _____ 260
Heat penetration temperature, ° C _____ 260

Three copolymer lots according to the present invention are prepared utilizing the following proportions:

|  | Lots | | |
|---|---|---|---|
|  | A | B | C |
| "Epon 828" epoxy resin | 100 | 100 | 100 |
| N,N'-bis-1,2-ethylenisophthalamide | 126 | 54 | 216 |
| Isophthalyl dihydrazide | 120.5 | 48.5 | 80.6 |
| Primary hydrogen-ring ratio | 1/1 | 1/1 | 2/3 |
| Azirane-oxirane ratio | 4/1 | 1/1 | 4/1 |

These resin mixtures are prepared by stirring the finely ground solid bis-amide into the liquid epoxy resin at 80° C., continuing agitation until the bis-amide has dissolved, cooling the resulting solution to room temperature, adding the finely divided isophthalyl dihydrazide and stirring to form a uniform slurry.

Three lots of 12 ply glass fiber-reinforced plastic laminates are prepared from the above resin systems and the resulting reinforced plastics are given the same lot designations as the resin systems from which they are respectively made. The laminates are prepared by the procedure disclosed in Example 1 hereof and are cured for 30 minutes at 310° F. and 25 p.s.i. in an hydraulic press, and then for 13 hours at 350° F. in a circulating air oven. The following data are obtained from tests run on these laminates:

|  | Lots | | |
|---|---|---|---|
|  | A | B | C |
| Resin contents (percent) | 48.8 | 43.7 | 43.0 |
| Density (g./cc.) | 1.73 | 1.66 | 1.63 |
| Flexural properties of laminates: | | | |
| Post cured 5 hrs. at 177° C.: | | | |
| At 25° C.: | | | |
| $SF \times 10^{-3}$ | 74.0 | 84.5 |  |
| $E_B \times 10^{-6}$ | 5.24 | 5.32 |  |
| At 150° C.: | | | |
| $SF \times 10^{-3}$ | 48.4 | 33.8 |  |
| $E_B \times 10^{-6}$ | 3.76 | 3.68 |  |
| At 205° C.: | | | |
| $SF \times 10^{-3}$ | 7.5 | 7.1 |  |
| $E_B \times 10^{-6}$ | 1.06 | 1.31 |  |
| At 230° C.: | | | |
| $SF \times 10^{-3}$ | 3.1 | 3.6 |  |
| $E_B \times 10^{-6}$ | 0.61 | 0.78 |  |
| Post cured 13 hr. at 177° C.: | | | |
| At 25° C.: | | | |
| $SF \times 10^{-3}$ |  |  | 93.6 |
| $E_B \times 10^{-6}$ |  |  | 4.75 |
| At 150° C.: | | | |
| $SF \times 10^{-3}$ |  |  | 74.5 |
| $E_B \times 10^{-6}$ |  |  | 4.01 |
| At 205° C.: | | | |
| $SF \times 10^{-3}$ |  |  | 30.3 |
| $E_B \times 10^{-6}$ |  |  | 3.07 |
| At 230° C.: | | | |
| $SF \times 10^{-3}$ |  |  | 12.7 |
| $E_B \times 10^{-6}$ |  |  | 1.88 |
| Heat distortion temp. (° C.) | 270 | 270 |  |
| Heat penetration temp. (° C.) | 270 | 270 |  |
| Impact strength (Izod) (ft. lbs./inch) | 15.95 | 15.61 |  |
| Resin loss data after exposure at 260° C.: | | | |
| Resin loss at 16 hrs. (percent) | 15.85 | 23.50 | 11.55 |
| Resin loss at 50 hrs. (percent) | 18.18 | 20.43 |  |
| Effects of heat aging on flexural properties of laminates (tests run at room temp. after being heated as follows): | | | |
| Before heating: | | | |
| $SF \times 10^{-3}$ | 74.0 | 84.5 | 93.6 |
| $E_B \times 10^{-6}$ | 5.24 | 5.32 | 4.75 |
| 16 hrs. at 260° C.: | | | |
| $SF \times 10^{-3}$ | 19.5 | 66.4 | 27.0 |
| $E_B \times 10^{-6}$ | 6.30 | 5.48 | 5.57 |
| 50 hrs. at 260° C.: | | | |
| $SF \times 10^{-3}$ | 22.6 | 58.8 |  |
| $E_B \times 10^{-6}$ | 5.73 | 5.40 |  |

A copper-clad glass fiber-reinforced plastic laminate is prepared utilizing a copolymer resin composition of the invention as follows: Copper foil (0.0014" in thickness) is press cured to a 4 ply lay up of previously sized glass fabric impregnated with a resin mixture consisting of 216 parts by weight of N,N'-bis-1,2-ethylenisophthalamide, 100 parts by weight of "Epon 828" epoxy resin and 120.5 parts by weight of isophthalyl dihydrazide. The press cure is 310° F. for 20 minutes under 25 p.s.i. followed by an oven postcure of 5 hours at 350° F. No blistering is observed during a hot soldering test of this laminate at 230° C. thus indicating the utility of this system for use as a substrate for printed circuits.

In a second preparation of a copper clad laminate, copper foil is bonded to a 1/16" thick sheet of phenolic resin with a mixture of 216 parts by weight of N,N'-bis-1,2-ethylenisophthalamide, 100 parts by weight of "Epon 828" epoxy resin and 80.6 parts by weight of isophthalyl dihydrazide. This laminate is cured for 20 minutes at 310° F. and 1000 p.s.i. No blistering is observed during a hot solder test of this laminate at 230° C., thus indicating the utility of this resin as an adhesive in copper clad phenolic laminates used in printed circuits.

*Example 23*

A copolymer composition according to the present invention consisting of 100 parts of "Epon 1310" epoxy resin and 100 parts of N,N'-bis-1,2-ethylenisophthalamide is prepared by slowly adding the ground epoxy resin to the liquid bis-amide at approximately 80° C. with agitation and continuing the agitation until the mixture is homogeneous.

A 12 ply glass fiber-reinforced plastic laminate is prepared by the procedure disclosed in Example 1 hereof utilizing this resin. The laminate is press cured for 20 minutes at 155° C. and 25 p.s.i. and then postcured for 14 hours at 175° C. The following data are obtained from tests run on this laminate.

Resin content (percent) _____ 23.7
Flexural properties (of laminates):
  At 25° C.:
    $SF \times 10^{-3}$ _____ 72.2
    $E_B \times 10^{-6}$ _____ 2.83
    Failure _____ B
  At 150° C.:
    $SF \times 10^{-3}$ _____ 61.8
    $E_B \times 10^{-6}$ _____ 2.47
    Failure [1] _____ B
  At 204° C.:
    $SF \times 10^{-3}$ _____ 43.9
    $E_B \times 10^{-6}$ _____ 2.20
    Failure [1] _____ B
  At 260° C.:
    $SF \times 10^{-3}$ _____ 10.9
    $E_B \times 10^{-6}$ _____ 1.40
    Failure [1] _____ D, B
Resin loss data after exposure at 260° C.:
  Resin loss at 16 hrs. (percent) _____ 9.83
  Resin loss at 60 hrs. (percent) _____ 14.3
  Resin loss at 108 hrs. (percent) _____ 17.1
Flexural properties (of laminate) (these tests run at rm. temp. after heating laminate 228 hrs. at 260° C.:
  Resin in laminate after heating (percent) ___ 17.8
  Percent of resin lost during heating _____ 24.9
  $SF \times 10^{-3}$ (p.s.i.) _____ 29.975
  $E_B \times 10^{-6}$ (p.s.i.) _____ 2.54
  Failure [1] _____ D

[1] Failure of specimens: B, break; D, delamination.

*Example 24*

About 100 parts of "Epon 1310" epoxy resin and 60 parts of 4,4'-diamino diphenylsulfone are pulverized and mixed as powders and this mixture is added to 100 parts of N,N'-bis-1,2-ethylenisophthalamide by the procedure of the preceding example. The resulting fluid mixture is poured into a mold and cured for 1 hour at 65° C., 1 hour at 85° C., 1 hour at 120° C., 18 hours at 178° C. and 1 hour at 204° C. The following data are obtained from tests run on the resulting hard solid.

Physical properties:
- Tensile strength (p.s.i.) _____ 2,824
- Elongation (percent) _____ 0.034
- Modulus in tension (p.s.i.) _____ $8.67 \times 10^6$
- Flexural strength (p.s.i.) _____ 8,784
- Modulus in flexure (p.s.i.) _____ $5.45 \times 10^5$
- Hardness, Rockwell _____ E-78

Electrical properties:
- Dissipation factor (1 kc.) _____ 0.00720
- Dielectric constant (1 kc.) _____ 4.04

Aging properties:
- Water absorption, 24 hrs. (percent), 30° C. ___ 0.498
- Water absorption, 1 wk. (percent), 30° C. ____ 1.63
- Weight loss (200 hrs./500° F.) (percent) ____ 16.0

In another preparation about 50 parts of "Epon 1310" epoxy resin, 50 parts of N,N'-bis-,2-ethylenisophthalamide and 30 parts of 4,4'-diaminodiphenyl sulfone are mixed thoroughly with heating at about 90° C., placed in a mold and cured at 120° C. for 14 hours to a casting of solid resin which has a hardness (Rockwell) of M-90.

Example 25

About 100 parts of "Epon 1310" epoxy resin and 2 parts of boron trifluoride-monoethylamine are pulverized and mixed as powders and this mixture is added to 100 parts of N,N'-bis-1,2-ethylenisophthalamide by the procedure of the preceding example. The resulting mixture is placed in a mold and cured, first in an oven at about 20 mm. Hg pressure for 1½ hours at 75° C. and ½ hour at 95° C. and then at atmospheric pressure for 2 hours at 85° C., 16 hours at 120° C., 1 hour at 150° C., 42 hours at 178° C. and 1 hour at 204° C. The following test data are obtained from tests run on this resin.

Physical properties:
- Tensile strength (p.s.i.) _____ 14,080
- Elongation (percent) _____ $^{1}$0.047
- Modulus in tension (p.s.i.) _____ $8.12 \times 10^6$
- Flexural strength (p.s.i.) _____ 11,275
- Modulus in Flexure (p.s.i.) _____ $5.0 \times 10^5$
- Compression strength (p.s.i.) ___ 41,200
- Modulus in compression (p.s.i.) ___ $7.10 \times 10^5$
- Compression strain at failure (percent) ___ 14.1
- Compression yield stress (p.s.i.) _____ $(^2)$
- Compression yield strain (percent) _____ $(^2)$
- Hardness, Rockwell _____ E-100
- Heat distortion (° C.) _____ 215

Electrical properties:
- Dissipation factor (1 kc.) _____ 0.00354
- Dielectric constant (1 kc.) _____ 4.05

Aging properties:
- Water absorption, 24 hrs. (percent) 30° C. __ 0.375
- Water absorption, 1 week (percent), 30° C. __ 1.27

$^1$ Jaw break.
$^2$ No yield point.

Two copolymer lots of the present invention are prepared by the same procedure utilizing the following proportions of ingredients:

| | Lots | |
|---|---|---|
| | A | B |
| "Epon X-1310" epoxy resin | 75 | 100 |
| N,N'-bis-1,2-ethylenisophthalamide | 25 | 100 |
| Boron trifluoride monoethylamine | 2 | 4 |

Two lots of 12 ply glass fiber-reinforced plastic laminates are prepared using these resin systems and the resulting reinforced plastics are given the same lot designations as the resins from which they are respectively made. The laminates are prepared according to the procedure disclosed in Example 1 hereof and are cured in a heated hydraulic press for 20 minutes at 155° C. at 25 p.s.i. and then postcured for 14 hours at 175° C. The following test data are obtained from tests run on these laminates:

| | Lots | |
|---|---|---|
| | A | B |
| Resin content (percent) | 24.7 | 33.8 |
| Flexural properties (of laminates): | | |
| At 25° C.: | | |
| $SF \times 10^{-3}$ | 68.7 | 81.8 |
| $E_B \times 10^{-6}$ | 2.96 | 2.38 |
| Failure $^1$ | B | B |
| At 150° C.: | | |
| $SF \times 10^{-3}$ | 40.8 | 69.1 |
| $E_B \times 10^{-6}$ | 2.30 | 2.04 |
| Failure $^1$ | B | B |
| At 204° C.: | | |
| $SF \times 10^{-3}$ | 27.0 | 53.3 |
| $E_B \times 10^{-6}$ | 2.50 | 1.91 |
| Failure $^1$ | B | B |
| At 260° C.: | | |
| $SF \times 10^{-3}$ | 21.6 | 19.5 |
| $E_B \times 10^{-6}$ | 2.54 | 1.23 |
| Failure $^1$ | D | B,D |
| Resin loss data after exposure at 260° C.: | | |
| Resin loss at 16 hrs. (percent) | 10.12 | 8.32 |
| Resin loss at 60 hrs. (percent) | 16.1 | 12.9 |
| Resin loss at 108 hrs. (percent) | 19.6 | |
| Resin loss at 132 hrs. (percent) | | 17.0 |
| Flexural Properties (of laminate) (tests run at room temp. after heating laminates for the indicated time at 260° C.), hours | 228 | 204 |
| Resin in laminate after heating (percent) | 17.58 | 27.14 |
| Percent of resin lost during heating | 28.8 | 19.7 |
| $SF \times 10^{-3}$ (p.s.i.) | 37.800 | 26.565 |
| $E_B \times 10^{-6}$ (p.s.i.) | 2.48 | 1.78 |
| Failure $^1$ | D | D |

$^1$ Failure of specimens: B, break; D, delamination.

About 50 parts of N,N'-bis-1,2-ethylenisophthalamide, 50 parts of "Epon 1310" epoxy resin and 2 parts of boron trifluoride monoethylamine are mixed together at room temperature and gradually heated to 170° F. until a uniform solution is obtained. The mixture is then cooled to 140° F. and hot melt coated onto vinylsilane-treated roving glass fibers having 200 ends per inch. The resin content of the coated glass fabric is approximately 35 percent. The coating qualities of this material are excellent. The web is somewhat tacky at room temperature immediately after coating, and after aging for two weeks at room temperature the web is still flexible, thus indicating good shelf life.

A 14 ply cross-laminated panel is prepared from this saturated fabric. The panel is cured in a heated hydraulic press for 30 minutes at 325° F. and 25 p.s.i. and then oven postcured for 16 hours at 400° F. The following test data are obtained from tests run on the panel.

- Resin content (percent) _____ 31
- Flexural properties of laminate:
  - At 25° C.:
    - $SF \times 10^{-3}$ _____ 88.7
    - $E_B \times 10^{-6}$ _____ 3.05
  - At 205° C.: $SF \times 10^{-3}$ _____ 54.9
  - At 260° C.: $SF \times 10^{-3}$ _____ 14.9
- Barcol hardness _____ 77
- Effects of heat aging on flexural properties (at 21° C. after 2 hr. in boiling water):
  - $SF \times 10^{-3}$ _____ 60.7
  - $E_B \times 10^{-6}$ _____ 2.79
- Water absorption:
  - Weight increase after 24 hr. immersion at rm. temp. (percent) $^1$ _____ 0.57
  - Thickness increase after 24 hr. immersion at rm. temp. (percent) $^1$ _____ 0.04

$^1$ Tests run according to Fed. Spec. LP-406.

Example 26

About 5 parts of N,N'-bis-1,2-ethylenisophthalamide, 5 parts of "ERL-2774" epoxy resin and 2 parts of metaphenylene diamine are mixed at approximately 80° C. with agitation until a homogeneous liquid mixture is obtained. This mixture is used to adhere chromate-etched aluminum test pieces together in overlapped relationship.

The test pieces are one inch in width. The liquid resin is applied to the test pieces with a spatula and the test pieces are brought together until they touch the opposite sides of two narrow 5 mil thick glass shims (which are used to insure that all of the resin is not later forced from between the test pieces). The test pieces are adhered together with an overlap of approximately 0.5 inch which is entirely filled with adhesive. The resulting test samples are placed in a hydraulic press of which the platens are held at 350° F. for 1 hour. The shear strengths at various temperatures of the resulting bonds are tested by pulling the ends of the pairs of adhered test pieces in tension until the bonds fail. The test is run on an Instron tensile machine with temperature controlled cabinets mounted thereon at a jaw separation rate of 0.2 inch/minute. The following test data are obtained.

| Temp. °F.: | Shear strength (p.s.i.) |
|---|---|
| −67 | 4,070 |
| +300 | 4,820 |
| +400 | 870 |
| +500 | 280 |

Comparison of the data in the foregoing table with that obtained using a comparable epoxy resin adhesive indicates that the use of the bis-amide comonomer in the adhesive produces not only improved high temperature strength, but also better low temperature properties.

Example 27

About 5 parts of N,N'-bis-1,2-ethylenisophthalamide, 5 parts of polychlorophenyl-bis (4-glycidoxy-phenyl)-methane (the preparation of which is given in Example 15 hereof) and 0.1 part of boron trifluoride monoethylamine are mixed at approximately 80° C. with agitation until a homogeneous liquid is obtained. This mixture is immediately poured into a mold and on standing gels within 5 minutes at room temperature. The resin system is then cured for 24 hours at 60° C. and 18 hours at 150° C. The resulting hard, resilient, tough, transparent, reddish-brown casting has a hardness (Rockwell L) of 122.

Example 28

About 99 parts of triglycidyl cyanurate, 108 parts of N,N'-bis-1,2-ethylenisophthalamide and 2 parts of boron trifluoride-monoethylamine are mixed as finely divided solids at room temperature and this mixture is heated until it becomes liquid. The liquid-mixture does not immediately solidify when allowed to cool, but will remain liquid at room temperature for more than 24 hours. This mixture is cured 40 hours at 140° F., 4 hours at 250° F. and 4 hours at 350° F. to form a hard resin having a tensile strength of 3700 p.s.i. and a modified heat deformation point (run according to the test explained in Example 9 hereof) of 235° C. This sample loses 30.5 percent of its weight when heated for 165 hours at 500° F.

Example 29

About 5.0 grams of N,N'-bis-1,2-propylenisophthalamide and 5.0 grams of "Epon 828" epoxy resin are mixed at room temperature, both being liquids. About 0.05 gram of solid finely divided boron trifluoride monoethylamine are dispersed in the resulting liquid mixture which is placed in a mold and cured for 3 hours at 150° C. The resulting hard, clear casting is light amber in color.

Example 30

About 100 parts of polychlorophenyl-bis (4-glycidoxyphenyl)-methane, 100 parts of N,N'-bis-1,2-ethylenisosebacamide, 100 parts of N,N'-bis-1,2-ethylenisophthalamide and 3 parts of boron trifluoride monoethylamine are mixed at approximately 80° C. until a homogeneous liquid is obtained. The resulting liquid is poured into an open mold and cured for 96 hours at 60° C. and 5 hours at 121° C. to form a hard, resilient, tough, transparent, reddish-brown casting having a hardness (Rockwell L) of 101.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. The product produced by the process of intimately contacting (1) a reaction product of a polyhydric phenol and a polyfunctional halohydrin, which reaction product contains more than one vicinal epoxy group, and (2) a polyalkylenamide represented by the formula:

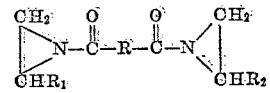

wherein R represents a member of the group consisting of a divalent aliphatic hydrocarbon radical having from 6 to 18 carbon atoms, the 1,3-phenylene radical and the 1,4-phenylene radical, and $R_1$ and $R_2$ each represent a member of the group consisting of hydrogen and a lower alkyl radical.

2. The product of claim 1 in which the polyfunctional halohydrin is epichlorohydrin.

3. The product of claim 1 in which said polyhydric phenol is bis(4-hydroxyphenyl)dimethylmethane.

4. The product of claim 1 in which the polyalkylenamide is N,N'-bis-1,2-ethylene sebacamide.

5. The product of claim 1 in which the polyalkylenamide is N,N'-bis-1,2-ethylene isosebacamide.

6. The product of claim 1 in which the polyalkylenamide is N,N'-bis-1,2-ethylene isophthalamide.

7. The product of claim 1 in which the polyalkylenamide is N,N'-bis-1,2-propylene isosebacamide.

8. The product of claim 1 in which the polyalkylenamide is N,N'-bis-1,2-propylene isophthalamide.

References Cited in the file of this patent

UNITED STATES PATENTS

| 2,296,225 | Ulrich | Sept. 15, 1942 |
| 2,901,443 | Starch et al. | Aug. 25, 1959 |
| 2,918,439 | Philips et al. | Dec. 22, 1959 |
| 2,950,197 | Allen et al. | Aug. 23, 1960 |

FOREIGN PATENTS

| 466,270 | Great Britain | May 24, 1937 |
| 899,955 | France | Sept. 11, 1944 |
| 900,137 | Germany | Dec. 21, 1953 |

UNITED STATES PATENT OFFICE
CERTIFICATE OF CORRECTION

Patent No. 3,079,367                          February 26, 1963

Paul Fram et al.

It is hereby certified that error appears in the above numbered patent requiring correction and that the said Letters Patent should read as corrected below.

Column 2, line 63, for "monomethylamine" read -- monoethylamine --; column 13, line 11, for "at" read -- to --; same line, for "-monoethylamide" read -- -monoethylamine --; column 16, Example 20, in the table, first column, line 2 thereof, for "N,'-bis-1,2-" read -- N,N'-bis-1,2- --; column 17, Example 21, sub-column heading, for "C", first occurrence, read -- A --; column 19, first table, column 2, line 2 thereof, for "126" read -- 216 --.

Signed and sealed this 31st day of December 1963.

(SEAL)
Attest:
ERNEST W. SWIDER

Attesting Officer

EDWIN L. REYNOLDS

Acting Commissioner of Patents